United States Patent [19]

Reed

[11] Patent Number: 4,462,977
[45] Date of Patent: Jul. 31, 1984

[54] RECOVERY OF ELEMENTAL SULFUR FROM SOUR GAS

[75] Inventor: Robert L. Reed, Tulsa, Okla.

[73] Assignee: Standard Oil Company (Indiana), Chicago, Ill.

[21] Appl. No.: 371,889

[22] Filed: Apr. 26, 1982

[51] Int. Cl.³ .................... C01B 17/04; B01J 8/04
[52] U.S. Cl. .................... 423/574 R; 422/171; 422/172; 422/173; 422/190
[58] Field of Search ............... 423/571, 573, 574, 576; 422/169–173, 189, 190

[56] References Cited

U.S. PATENT DOCUMENTS

| | | | |
|---|---|---|---|
| 3,702,884 | 11/1972 | Hunt, Jr. et al. | 423/222 |
| 3,749,762 | 7/1973 | Montgomery | 423/574 |
| 3,758,676 | 9/1973 | Goddin, Jr. et al. | 423/573 |
| 4,035,474 | 7/1977 | Kunkel et al. | 423/574 R |
| 4,071,607 | 1/1978 | Hiller et al. | 423/574 R |
| 4,088,744 | 5/1978 | Reed et al. | 423/573 G |
| 4,124,696 | 11/1978 | Kunkel | 423/574 R |
| 4,180,554 | 12/1979 | Goddin, Jr. et al. | 423/576 |
| 4,279,882 | 7/1981 | Beavon | 423/574 R |
| 4,315,904 | 2/1982 | Lell et al. | 423/574 R |

*Primary Examiner*—Earl C. Thomas

[57] ABSTRACT

Excess heat generated in a thermal reaction zone of a Claus sulfur recovery plant is used, by means of a high boiling point heat transfer medium, to reheat the Claus plant process stream prior to high temperature Claus catalytic conversion, and/or to regenerate Claus catalyst on which sulfur is deposited, or for other functions. In another aspect, low temperature Claus catalytic converters are operated at equivalent pressures during a cycle comprising an adsorption phase, a regeneration phase, and a cooling phase.

27 Claims, 3 Drawing Figures

RECOVERY OF ELEMENTAL SULFUR FROM SOUR GAS

FIELD OF THE INVENTION

The invention relates to recovery of elemental sulfur from gas streams containing hydrogen sulfide. In one aspect, the invention relates to method and apparatus for increasing sulfur recovery from such streams. In other aspects, the invention relates to method and apparatus for improving the energy efficiency of such recovery.

BACKGROUND OF THE INVENTION

A basic commercial procedure for recovery of hydrogen sulfide from acid gas streams is the Claus process. The basic chemical reactions occurring in the Claus process are presented in Equations (1), (2), and (3).

$$H_2S + \tfrac{1}{2}O_2 = H_2O + S \quad (1)$$

$$H_2S + 3/2 O_2 = H_2O + SO_2 \quad (2)$$

$$2H_2S + SO_2 = 2H_2O + 3S \quad (3)$$

Reactions (1) and (2) occur in a thermal zone (reaction furnace) and reaction (3) occurs in a catalytic zone (catalytic reactor). The Claus process thus comprises two stages: (1) a thermal stage above, for example, about 1000° F., and typically in the range of about 2000° F. to about 3000° F., and (2) a catalytic stage, generally, for example, between a temperature somewhat above the sulfur dew point of the gas stream and about 700° F.

In the thermal zone, a gas stream containing hydrogen sulfide can be burned with atmospheric oxygen in a reaction furnace, typically as indicated above in the range of about 2000° F. to about 3000° F., to form hot combustion gases containing a substantial amount of free sulfur which can be condensed after cooling the hot combustion gases, for example, first in a waste heat boiler and subsequently in a sulfur condenser.

The lean gas stream leaving the sulfur condenser, having a reduced concentration of sulfur species, can be reheated before being passed to a first catalytic reactor operated above the dew point of sulfur, for example, by recombining a controlled portion of hot combustion gases from the reaction furnace, with or without partial cooling with such reaction gases. The recombining can, for example, be effected via a bypass reheat line and valve, which can fail due to the necessity of operating under very severe conditions.

Such reheating of the gas stream in the Claus process prior to catalytic conversion is necessary to maintain the temperature of the gas stream flowing through the first, and subsequent, catalytic reactor(s) above the dew point of sulfur because condensation of sulfur can lead to rapid catalyst deactivation. The effluent gas streams containing free sulfur leaving each catalytic reactor can be then again cooled and sulfur condensed. The process of reheating, catalytically reacting, and sulfur condensing, may be repeated in one, two, or even three or more additional catalytic stages operated above the dew point of sulfur. As conversion of hydrogen sulfide to sulfur occurs in the catalytic stages and more sulfur is removed from the gas stream, the dew point of sulfur of the gas stream is reduced, permitting operation at lower temperatures, thus improving conversion. After leaving the last sulfur condenser, the gas stream, which may still contain appreciable amounts of sulfur compounds and some sulfur vapor, is either incinerated to convert all sulfur compounds to sulfur dioxide before venting to the atmosphere, or further treated in a separate process for removal of residual sulfur, such as, for example, by the so-called Cold Bed Adsorption (CBA) process, or other processes for tail-gas clean-up.

In the CBA (Cold Bed Adsorption) process, for example, typically as described in the U.S. Pat. Nos. 3,702,844, 3,758,676, 3,749,762, and 4,035,474, the hydrogen sulfide and sulfur dioxide content of Claus plant effluent streams is decreased by conversion to elemental sulfur in the presence of a Claus-type catalyst at a temperature effective for adsorbing a preponderance of the thus produced sulfur on the catalyst, typically, for example, between about 270° and 300° F. Since the Claus reaction is a reversible exothermic reaction and since the chemical process that occurs in the reactor can be viewed as an approach to chemical equilibrium, the lower temperatures associated with the CBA reactor have in principle two advantages over the higher temperature Claus reactor, each of which contributes to lower reactant concentrations and more efficient removal of sulfur. First, the temperature dependence of the thermodynamic equilibrium constant of an exothermic reaction favors lower reactant concentrations as the temperature decreases and the CBA reactors are operated at relatively low temperatures compared to the basic Claus process described above. Second, the particular temperature range of the CBA reactor is below the dew point of sulfur, so that physical deposition of a preponderance of the reaction product (free sulfur) as an adsorbed phase occurs. The CBA reactor unlike the high-temperature Claus reactor must, however, be periodically regenerated by vaporizing the deposited sulfur with a hot stripping or regeneration gas stream followed by cooling the reactor back to the desired operating temperature for adsorption, so that a complete sulfur recovery cycle for a given CBA reactor in more or less continuous operation includes an adsorption phase, a regeneration phase, and a cooling phase.

Various specific methods of regenerating the sulfur-laden catalyst of low temperature reactors involving a variety of proposed flow schemes have been suggested and implemented with varying degrees of commercial success. All have in common a basic heat energy requirement for vaporizing or desorbing sulfur from the catalyst.

SUMMARY OF THE INVENTION

According to the invention is process and apparatus for recovery of sulfur comprising combusting a gas stream containing hydrogen sulfide in the presence of oxygen in a thermal reaction zone to produce hot combustion gases containing hydrogen sulfide, sulfur dioxide, and free sulfur, catalytically reacting at least a portion of said sulfur dioxide and hydrogen sulfide in the hot combustion gases in a catalytic reaction zone to produce additional free sulfur, the catalytic reaction zone comprising at least one catalytic reactor operated at a temperture effective to adsorb a preponderance of the thus produced free sulfur on catalyst therein and to produce a lean effluent stream, heating a cool gas stream to a temperature effective for removal of adsorbed free sulfur from the catalyst of said at least one catalytic reactor in indirect heat exchange with the hot combustion gases to produce a hot regeneration stream, and removing adsorbed free sulfur from the catalyst of said at least one catalytic reactor by passing the hot regeneration stream in contact therewith to produce a regeneration stream laden with free sulfur. In a further aspect, the hot regeneration stream laden with free sulfur is cooled and free sulfur condensed therefrom.

Further according to the invention is process and apparatus for recovery of sulfur from a gas stream containing hydrogen sulfide comprising combusting the gas stream in the presence of oxygen in a thermal reaction zone to produce hot combustion gases containing hydrogen sulfide, sulfur dioxide, and free sulfur, cooling the hot combustion gases and condensing free sulfur therefrom to produce a first cool lean stream containing hydrogen sulfide and sulfur dioxide, heating the first cool lean stream to a temperature above the sulfur dew point in indirect heat exchange relation with the hot combustion gases to produce a first heated lean stream, and reacting hydrogen sulfide and sulfur dioxide in the first heated lean stream in a catalytic reaction zone to produce additional free sulfur, the catalytic reaction zone comprising at least one catalytic reactor operated above the sulfur dew point.

Further according to the invention is process and apparatus for the recovery of sulfur from a gas stream containing hydrogen sulfide and sulfur dioxide comprising passing the gas stream through a catalytic reactor during an adsorption phase to produce and adsorb free sulfur on a catalyst bed therein, removing the thus adsorbed free sulfur from the catalyst bed by passing a hot regeneration stream in contact therewith during a regeneration phase to regenerate the catalyst bed, and cooling the thus regenerated catalyst bed to a temperature effective for adsorbing free sulfur thereon in a cooling phase by passing a cooling stream in contact therewith, wherein the catalytic reactor is operated at about constant pressure during adsorption phase, regeneration phase and cooling phase.

BRIEF DESCRIPTION OF THE DRAWINGS

The invention will be better understood by reference to the drawings in which.

DETAILED DESCRIPTION OF THE DRAWINGS

Figure 1:
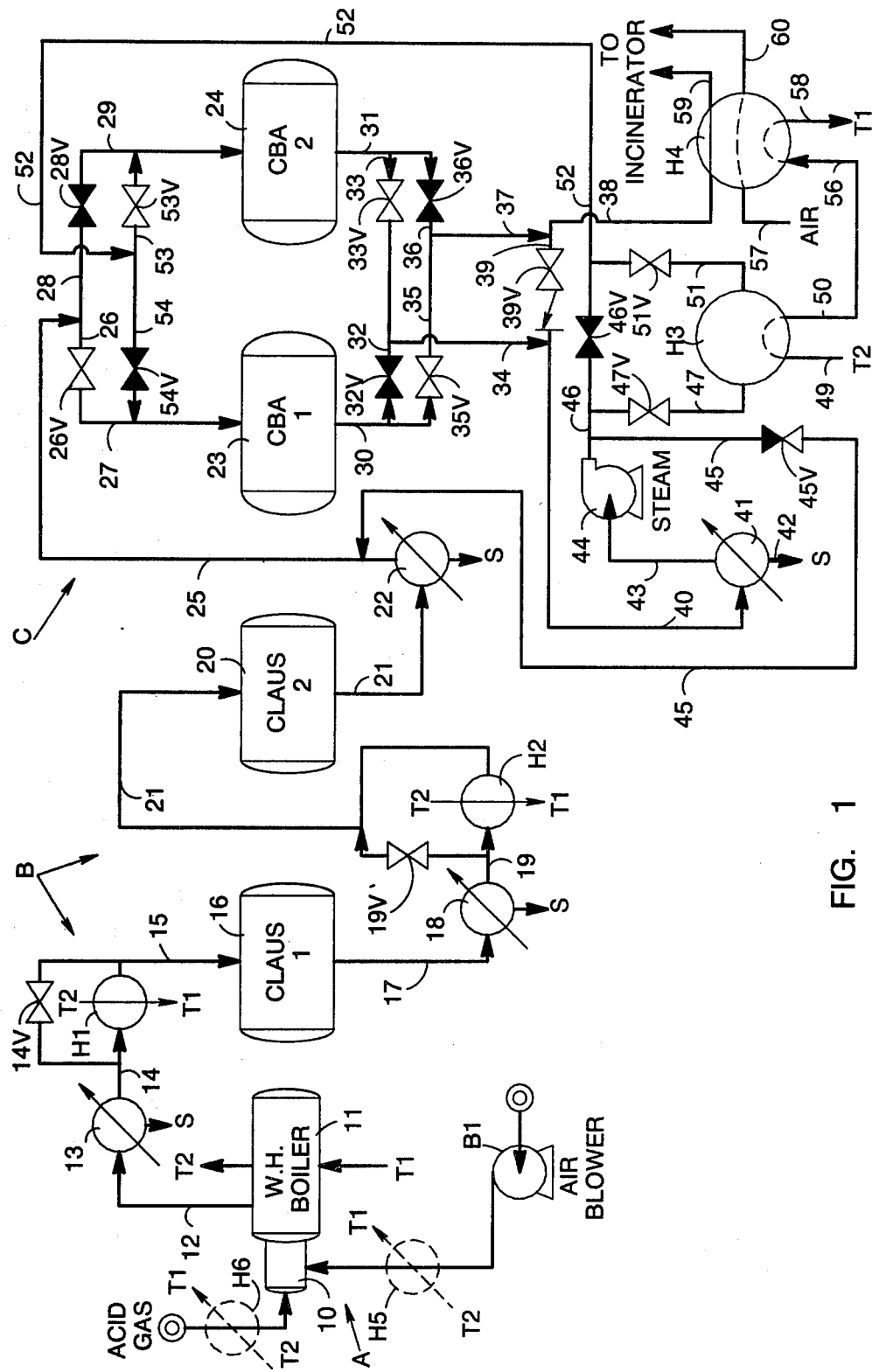
FIG. 1 represents a preferred embodiment of the invention.

FIG. 1 represents a preferred embodiment of the invention in which a gas stream containing hydrogen sulfide is combusted with air in a thermal reaction zone A to produce hot combustion gases containing hydrogen sulfide, sulfur dioxide, and free sulfur. The hot combustion gases, after cooling and removal of free sulfur therefrom to produce a stream leaner in sulfur containing species, are then subjected to catalytic conversion represented generally by reference letters B and C to produce and recover additional free sulfur from the stream. Reference letter B designates generally a Claus catalytic conversion zone comprising stages operated above the dew point of sulfur while reference letter C designates generally a catalytic conversion zone comprising stages operated at temperatures effective for depositing a preponderance of the free sulfur produced on the catalyst bed therein.

Referring now to the drawings in more detail and in particular to FIG. 1, an acid gas stream containing at least hydrogen sulfide is introduced into Claus furnace 10 constituting a thermal reaction zone operated at a temperature above about 1000° F. and typically on the order of 2000° F. or higher. The hydrogen sulfide in the gas stream is combusted with oxygen, usually provided by inlet air (atmospheric oxygen) introduced into furnace 10, for example, by blower B1, in the thermal reaction zone of furnace 10 to produce hot combustion gases containing free sulfur, water vapor, sulfur dioxide, and unreacted hydrogen sulfide. Each of the acid gas and the inlet air streams can optionally be preheated by indirect heat exchange with the hot combustion gases in waste heat boiler 11 by heaters H6 and H5, respectively, indicated in dashed lines. The indirect heat exchange is hereinafter described in greater detail and involves the transfer of sensible heat from a heated transfer stream T2 to the stream of interest with the production of a cooled transfer stream T1.

The gas stream comprising the hot combustion gases passes through waste heat boiler 11, for example, a shell-and-tube type heat exchanger, in indirect heat exchange relation with a cooled transfer stream T1 to produce a cooled combustion gas stream 12 and a heated transfer stream T2 employed as herein described. Preferably, as illustrated, waste heat boiler 11 is directly connected to furnace 10 although other designs can of course also be employed.

The heat transfer medium constituting the transfer streams T1 and T2 is preferably a boiling heat transfer medium; of course, non-boiling heat transfer media (at the temperatures of interest herein) such as molten salts, molten metals, or various organic or even inorganic materials having a very high boiling point, can also be used. Boiling heat transfer media are preferred because the agitation of boiling increases the heat transfer rate, resulting in benefits familiar to those skilled in the art. For use according to the present invention, the boiling heat transfer medium should have a boiling point above about 600° F., most preferably in the range of about 600° F. to about 750° F. because such media are effective for transfer of sufficient sensible heat from the hot combustion gases to a regeneration stream as hereafter described and can be employed in apparatus having metallurgical limits conventional in sulfur recovery apparatus.

A particularly preferred heat transfer medium is, for example, a eutectic mixture containing 26.5% by weight diphenyl and 73.5% by weight diphenyl oxide. Such an eutectic mixture is commercially available under the tradename Dowtherm A from Dow Chemical Company, Midland, Mich. 48640. At a temperature of 670° F., the vapor pressure of such an eutectic mixture is 84 psia (lbs/in$^2$ absolute).

In order to achieve a significant improvement in heat recovery and associated reduction in cost, the use of a temperature in the heat transfer medium in excess of 600° F. in the waste heat boiler is preferred. Generally, temperatures in excess of about 700° F. to 750° F. require the selection of more expensive structural materials but such higher temperatures are feasible. This is of importance with respect to the shell of the waste heat boiler 11, as well as the tubes within the waste heat boiler 11 that contain corrosive sulfur gases. A temperature range of about 640° F. to about 670° F. is preferred in that such a range provides good efficiency well within commercially available material specifications and reflux mediums. At these temperatures, sulfur gas-resistant grades of stainless steel or the like are the preferred materials for construction of the waste heat boiler tubes, while less expensive carbon steel material can be used, for example, for the shell side of the boiler.

The hot combustion gas stream, after cooling in waste heat boiler 11 to a temperature typically in the range of about 500° F. to about 1200° F. is passed through line 12 to first sulfur condenser 13. Within condenser 13, the stream comprising the hot combustion gases is temporarily cooled below the sulfur dew point, i.e., below about 400° F. for sulfur (S) removal. The lean effluent stream of reduced sulfur content is then passed to first reactor heater H1 via line 14 and heated in indirect heat exchange relation with a portion of heated transfer stream T2 to a temperature above the sulfur dew point, that is, about 400° F., preferably in the range of about 400° F. to about 650° F. Bypass valve 14V provides additional flow and temperature control. The cooled transfer stream T1 can be returned to the waste heat boiler as indicated.

By utilizing indirect heat exchange, in accordance with one aspect of the invention, for reheating the process stream following sulfur condensing, the sulfur condensers associated with the Claus high temperature process can be operated at lower temperatures than is appropriate when by-pass reheating using a portion of the hot combustion gases is employed. This can result in removing a larger percentage of free sulfur and therefore in a fractional increase in the overall sulfur recovery. Thus, in accordance with one aspect of the invention, the sulfur condensers, in this instance sulfur condenser 13, (and as subsequently described sulfur condensers 18 and 22) can be operated in the range of about 260° F. to about 400° F., preferably in the range of about 260° F. to about 280° F. One advantage of operating the sulfur condensers at such lower and uniform temperatures is that the condensers can be conveniently enclosed in the same housing.

The preheated lean stream from first reactor heater H1 is passed through line 15 to a first Claus catalytic reactor 16 operated above the dew point of sulfur. Effluent from the first Claus catalytic reactor 16 exits through line 17 to sulfur condenser 18 for cooling, further condensing, and recovery of sulfur. The lean effluent stream low in free sulfur from condenser 18 is passed through line 19 to second reactor heater H2 in which the lean stream is heated to a temperature above the dew point of sulfur in indirect heat exchange relation with a portion of heated transfer stream T2. The cooled transfer stream T1 can be returned to the waste heat boiler 11 as indicated. Bypass valve 19V provides additional flow and temperature control and the resulting preheated lean stream is passed through line 21 to a second Claus catalytic reactor 20 operated at a temperature above the dew point of sulfur.

The effluent exiting second Claus catalytic reactor 20 passes through line 21 to a third sulfur condenser 22 for further removal of free sulfur therefrom before being delivered to a tail gas treating process indicated generally by C through line 25.

As will be appreciated by those knowledgeable in the art of sulfur recovery, the lower the operating temperature in the Claus catalytic reactors 16 and 20, the more complete conversion can be obtained. Consequently, it is advantageous to have several Claus catalytic conversion stages (in the illustrated embodiment two such catalytic stages are employed) with condensation and removal of sulfur following each stage.

The tail gas treating process illustrated generally at C comprises two catalytic conversion stages or reactors operated at a temperature effective for depositing or adsorbing a preponderance of the free sulfur produced on the catalyst therein. By a preponderance of the produced sulfur is meant more than half and typically 90 percent or more of the free sulfur produced. In the illustrated embodiment, the catalytic conversion stages are exemplified by first CBA reactor 23 and second CBA reactor 24. Preferably, each of reactor 23 and reactor 24 comprises a horizontally supported bed of catalyst in contact with which a gas stream containing hydrogen sulfide and sulfur dioxide is passed and on which catalyst free sulfur is adsorbed. In the preferred embodiment of FIG. 1, as will be hereafter described, the direction of flow of the gas stream through a respective reactor is downward through the bed of catalyst whether the respective catalytic stage is undergoing adsorption, regeneration, or cooling.

In the illustrated embodiment of FIG. 1, first CBA reactor 23 is undergoing adsorption while second CBA reactor 24 is undergoing regeneration. Referring to the drawing in more detail, the Claus process tail gas stream containing sulfur dioxide and hydrogen sulfide from third sulfur condenser 22 is passed through line 25, line 26 and associated valve 26V, and line 27 into the upper inlet of first CBA reactor 23. In first CBA reactor 23, the tail gas stream is passed downward through and in contact with the horizontally supported catalyst bed depositing sulfur on the catalyst in the process and the lean effluent stream exits reactor 23 through line 30, line 35 and associated valve 35V, line 37, and line 38 to incinerator preheater H4 in which the lean effluent stream is heated in indirect heat exchange relation with a portion of heated transfer stream T2 by lines 56 and 58 prior to being passed through line 59 to an incinerator (not shown). The cooled transfer stream T1 is returned to the waste heat boiler 11 as indicated. The incinerator preheater H4 can also be utilized to preheat the incinerator air 57 as indicated in line 60 to the incinerator (see discussion below in reference to FIG. 2). Such use of the sensible heat derived from waste heat boiler 11 can significantly reduce incinerator operating expense.

At the same time, second CBA reactor 24 is undergoing regeneration in which a regeneration stream is passed through line 52, line 53 and associated valve 53V (shown open), and line 29 into the upper inlet of second CBA reactor 24. The hot regeneration stream flows downward through and in contact with the horizontally supported catalyst bed in reactor 24 vaporizing and removing the sulfur deposited thereon and the sulfur laden stream exits through line 31, line 33 and valve 33V (shown open), line 34, and line 40 to sulfur condenser 41, preferably operated at temperatures such as set forth above for condenser 13, where the stream is cooled and the free sulfur is condensed and removed via line 42. The cooled lean regeneration stream from which free sulfur has been removed from sulfur condenser 41 is passed through line 43 to blower 44, line 46, line 47 and associated valve 47V (shown open) to regeneration stream heater H3 in which the cooled lean regeneration stream is reheated in indirect heat exchange relation with heated transfer stream T2 by lines 49 and 50 to a temperature effective for vaporizing sulfur before being returned through line 51 and associated valve 51V to line 52 and thence back to second CBA reactor 24 as described above. Preferably the regeneration stream is heated to a temperature in the range of about 500° F. to about 750° F. and most preferably in a range from about 600° F. to about 700° F. The cooled transfer stream T1 is returned to the waste heat boiler 11 as indicated.

Blower 44 is sized to accommodate the flow rate and pressure increase required to drive the regeneration stream through the catalyst bed of the reactor undergoing regeneration, sulfur condenser 41, and associated piping and valves and to equalize pressures at the outlet of each of CBA reactors 23 and 24 whether a respective reactor is undergoing adsorption phase, regeneration phase, or cooling phase. Make-up gas for maintaining the regeneration stream and the catalytic reactor effluent stream at about equal pressures is derived from the lean effluent stream, for example, in line 37 via line 39 and check valve 39V. A steady flow of tail gas into the regeneration or cooling stream can be assured by providing a steady flow of the lean stream from the discharge of blower 44 through line 45 and associated valve 45V to line 25 so that a steady flow of gas from the reactor 23 on adsorption via valves 35V and 39V enters the regeneration loop.

Following completion of removal of deposited sulfur from the catalyst bed of second CBA reactor 24, the regeneration stream bypasses regeneration stream heater H3 by closing valves 47V and 51V (shown open) and opening bypass valve 46V (shown closed), and the temperature of the second CBA reactor 24 is permitted to return to operating temperatures by passing the resulting cooling stream in contact with the catalyst bed. As can be appreciated from the above description, the direction of flow of the gaseous streams through the catalyst bed is downward through the horizontally supported bed whether a CBA reactor is undergoing adsorption, regeneration, or cooling phase.

As illustrated, the regeneration and cooling streams (described below) are recirculated through the reactor undergoing regeneration or cooling. Make-up gas is derived from the effluent streams lean in sulfur-containing species from the low temperature reactor(s) undergoing formation and deposition of sulfur. A consequent advantage is that the regeneration and cooling streams can be significantly lower in free sulfur than can be achieved in processes where the regeneration stream is directly derived from the hot combustion gases of the thermal reaction zone A.

After reactor 24 is cooled to an operating temperature effective for adsorption of a preponderance of free sulfur thus produced thereon, valves 28V in line 28 and 36V in line 36 can be opened and valves 26V in line 26 and 35V in line 35 can be closed so that the tail gas stream formerly passing through first CBA reactor 23 now selectively is passed through second CBA reactor 24 undergoing adsorption. Similarly, valves 54V in line 54 and 32V in line 32 can be opened and valves 53V in line 53 and 33V in line 33 can be closed so that the regeneration stream now selectively flows through first CBA reactor 23.

Since the outlets of both first CBA reactor 23 and second CBA reactor 24 are operated at approximately equal pressures whether undergoing adsorption, regeneration, or cooling, no sudden pressure differential will occur when switching from adsorption, regeneration, or cooling. Further, by so maintaining pressure at the outlets of the CBA reactors approximately equal, losses due to valve leakage in the regeneration and recovery stream and associated equipment can be minimized.

Similarly, since according to the preferred embodiment of FIG. 1 the direction of flow of the gas stream through the catalyst bed of a catalytic reactor is the same whether the reactor is undergoing adsorption, regeneration, or cooling, fluidization and channeling of the catalyst bed and diminished recovery which can result therefrom is minimized.

Figure 2:
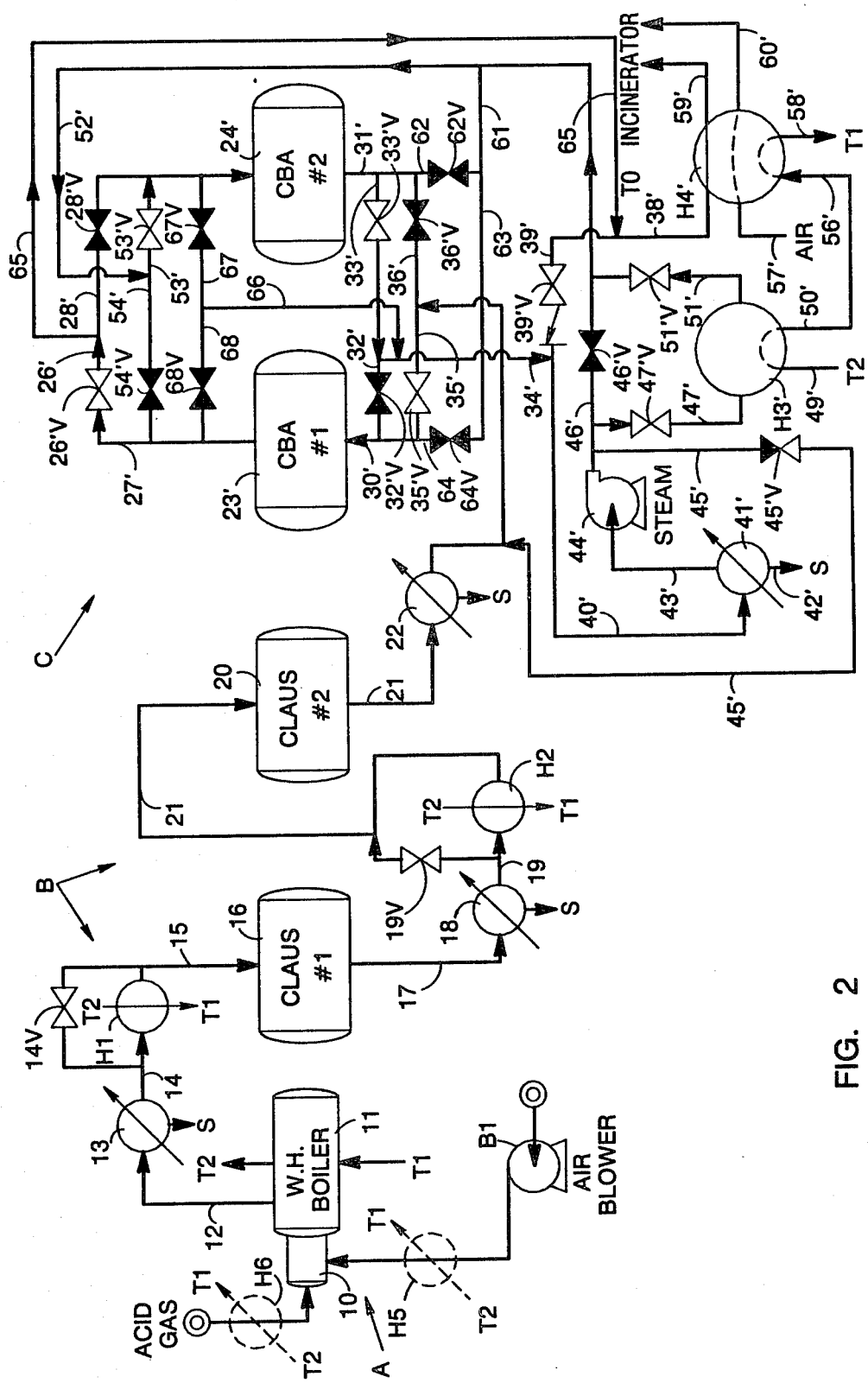
FIG. 2 represents an alternative embodiment of the invention.

Referring now to FIG. 2, FIG. 2 represents an alternative embodiment of the invention in which the direction of flow of a gas stream through a catalyst bed undergoing adsorption or cooling is up flow while the direction of flow through a catalyst bed undergoing regeneration is downflow.

Referring now to FIG. 2 in more detail, reference letters A and B, respectively, refer to a thermal reaction zone and a Claus process zone operated above the dew point of sulfur as previously described with respect to FIG. 1. Reference letter C designates generally a catalyst conversion zone comprising stages operated at temperatures effective for depositing a preponderance of the free sulfur on catalyst therein. Reference numerals and description for the thermal reaction zone A and the Claus process zone B are as described above with reference to FIG. 1 and will not be repeated here. With reference to reference letter C, the tail gas stream from third sulfur condenser 22 of the Claus process zone is passed through line 35' and associated valve 35'V and line 30' to the lower inlet of first CBA reactor 23' which is undergoing adsorption. The tail gas stream flows up through the catalyst bed depositing or adsorbing sulfur thereon and the lean stream leaves the (upper) outlet of reactor 23', flows through line 27', line 26' and associated valve 26'V (shown open) and line 65 to incinerator preheater H4' where the stream gains sensible heat in indirect heat exchange with heated transfer stream T2 before being passed through line 59' to an incinerator (not shown). Incinerator air 57' can also be heated in heater H4 and the resulting heated air stream 60' provided to the incinerator to reduce fuel costs in the incinerator. Cooled transfer stream T1 can be returned to the waste heat boiler 11 as indicated.

At the same time, second CBA reactor 24' is undergoing regeneration in which a regeneration stream is preheated in regeneration heater H3' to a temperature effective for removing deposited sulfur from the catalyst in indirect heat exchange relation with heated transfer fluid stream T2 and thence passes through line 51' and associated valve 51'V (shown open), line 52', line 53' and associated valve 53'V (shown open) to flow downward through the catalyst bed in second CBA reactor 24'. The cooled transfer stream T1 is returned to waste heat boiler 11 as indicated.

The lean effluent stream from reactor 24' is passed through line 31', line 33' and associated valve 33'V (shown open), line 34', and line 40' to sulfur condenser 41' where free sulfur is condensed and removed through line 42'. The lean stream from condenser 41' is passed through line 43' to the inlet of blower 44', line 46', line 47' and associated valve 47'V to regeneration heater H3.

A steady flow of tail gas from first CBA reactor 23' through check valve 39'V can be assured by maintaining a steady flow from the discharge of blower 44' through line 45' and associated valve 45'V to the inlet of first CBA reactor 23' as described above. Constant pressure at the outlet of first and second CBA reactors 23' and 24' is maintained as described above with reference to FIG. 1.

Other elements of FIG. 2 are described above with reference to the corresponding numerals of FIG. 1 (see above, for example, for discussion of reference numerals corresponding to 28', 28'V, 36', 36'V, 39', 46'V, 49', 50', 54', 54'V, 56' and 58') or below with reference to FIG. 3 (see below, for example, for discussion of reference numerals 61, 62, 62V, 63, 64 64V, 67, 67V, 68 and 68V).

Figure 3:
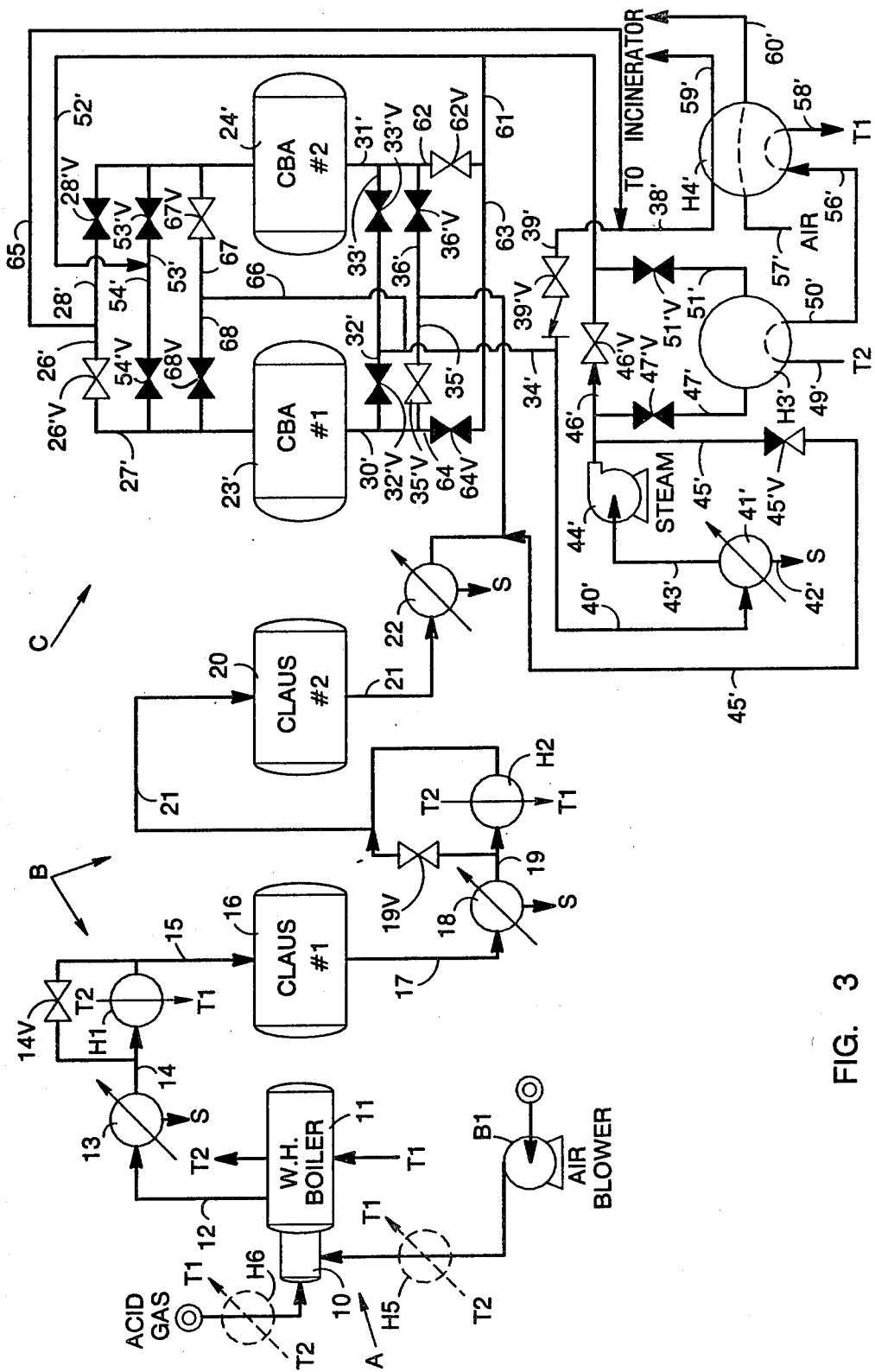
FIG. 3 further illustrates certain functional aspects of the embodiment of FIG. 2.

FIG. 3 illustrates the embodiment of FIG. 2 in which second CBA reactor 24' is undergoing cooling. As indicated in FIG. 3, during cooling the regeneration heater is bypassed by closing valves 47'V and 51'V and opening valve 46'V. Valve 53'V is closed and valve 62V is opened so that the cooling stream flows through line 61, line 62 having associated valve 62V (shown open), and line 31' to the (lower) inlet of second CBA reactor 24'. The cooling stream flows upward through the catalyst bed of reactor 24' and thence through line 67 and associated valve 67V, line 66, line 34', and line 40' to sulfur condenser 41' and thence via line 43', blower 44', line 46' and associated valve 46'V back to line 61 to complete the cooling loop.

Referring again to FIG. 2, first CBA reactor 23' can selectively be removed from adsorption and placed on regeneration by closing valves 26'V and 35'V and by opening valves 54'V and 32'V. Similarly, second CBA reactor can be placed on adsorption by opening valves 36'V and 28'V and closing valves 33'V and 53'V. With the valves so controlled, the tail gas stream flows through line 36' and associated valve 36'V and line 31' to second CBA reactor 24', flows upward through the catalyst bed therein, passes outward through line 28' and associated valve 28'V to line 65 and thence through line 38', incinerator heater H4', and line 59' to the incinerator (not shown) as described above. Air 57' can also be preheated in heater H4' to produce heated air stream 60' to the incinerator. At the same time, the regeneration stream from regeneration heater H3' passes through line 51' and associated valve 51'V, line 52', line 54' and associated valve 54'V to the (upper) inlet of first CBA reactor 23', flows downward through the catalyst bed, out the (lower) portal through line 64, line 32' and associated valve 32'V, line 34', and line 40' to sulfur condenser 41'. The lean stream from condenser 41' is then returned to regeneration heater H3' through line 43', blower 44', line 46', and line 47' with associated valve 47'V.

Referring again to FIG. 3, first CBA reactor 23' can be placed on cooling by closing valves 62V in line 62 and 67V in line 67 and by opening valves 64V in line 64 and 68V in line 68 so that the cooling stream flows from blower 44' through line 46' with associated valve 46'V, line 61, line 63, line 64 with associated valve 64V and line 30' to the (lower) portal of first CBA reactor 23', thence through line 27', line 68 with associated valve 68V, line 66, line 34', and line 40' back to sulfur condenser 41'.

To further illustrate the invention, the following examples are provided. Other apparatus elements of FIG. 3 have been described by reference to similarly numbered elements of FIGS. 1 and 2 above and will not be repeated here. Thus, apparatus elements in zones A and B of FIG. 3 correspond to those in FIGS. 1 and 2; and certain apparatus elements of zone C of FIG. 3 not mentioned specifically in reference to FIG. 3 correspond to the similarly numbered elements described in reference to FIG. 2 above.

EXAMPLE I

Calculated heat balances are provided for the following three cases having 80 mol %, 50 mol %, and 20 mol % $H_2S$, respectively, in the acid feed gas to Claus furnace 10. Reference numerals to the FIGURES are enclosed in parentheses.

Case 1—80 mol % $H_2S$ Acid Feed Gas

Case 1 illustrates a process according to the embodiment of FIG. 1 utilizing heaters H1, H2, H3, and H4 wherein heater H4 is utilized for incinerator tail gas heating and for incinerator air preheating. The calculated heat balance is illustrated in Table 1 below.

TABLE 1

| Equipment | Process Gas (°F.) | | Heat Transferred (MBTU/Hr) | |
|---|---|---|---|---|
| | In | Out | To T2 | From T2 |
| Waste Heat Boiler (11) | 2254 | 750 | 49,342 | |
| Heater (H1) | 260 | 572 | | 6,430 |
| Heater (H2) | 260 | 401 | | 2,789 |
| Heater (H3) | (Varies) | 650 | | 7,300 (max.) |
| Incinerator Tail Gas Heater (H4) | 287 | 650 | | 7,081 |
| Incinerator Air Heater (H4) | 50 | 650 | | 6,461 |
| Total | | | 49,342 | 30,061 |

As indicated, for the illustrated case, a maximum of 7,300 MBTU/hr is transferred from T2 in heater H3 for regeneration of a CBA reactor. Depending on the regeneration heater H3 load, from about 19,000 MBTU/hr to about 26,500 MBTU/hr can be available, for example, to generate steam or to superheat saturated steam.

Use of heaters on the tail gas stream and the air stream to the incinerator can save about 325 MCFD of fuel gas (methane). At a fuel cost, for example, of $3.50 per MCF, the savings can amount to about $1,100 per day.

Case 2—50 mol % $H_2S$ Acid Feed Gas

Case 2 illustrates a process according to the embodiment of FIG. 1 utilizing heaters H1, H2, H3, H4, and H5, wherein heater H4 is utilized both for tail gas heating and for preheating the air to the incinerator. A calculated heat balance is illustrated in Table 2 below.

TABLE 2

| Equipment | Process Gas (°F.) | | Heat Transferred (MBTU/Hr) | |
|---|---|---|---|---|
| | In | Out | To T2 | From T2 |
| Waste Heat Boiler (11) | 2019 | 750 | 30,845 | |
| Heater (H1) | 260 | 572 | | 5,438 |
| Heater (H2) | 260 | 400 | | 2,299 |
| Heater (H3) | Varies | 650 | | 7,036 (max.) |
| Incinerator Tail Gas Heater (H4) | 285 | 650 | | 6,123 |
| Air Heater (H5) | 167 | 600 | | 3,745 |
| Incinerator Air Heater (H4) | 50 | 650 | | 6,072 |
| Total | | | 30,845 | 30,713 |

As indicated, for the illustrated case, a maximum of about 7,036 MBTU/hr is transferred from T2 in heater H3 for regeneration of a CBA reactor. Depending on the regeneration heater H3 load, from about 132 MBTU/hr to about 7,168 MBTU/hr can be available, for example, to generate steam or to superheat saturated steam.

In the illustrated case, a portion of the sensible heat available in stream T2 is utilized in an air heater (H5) to save about 138 MCFD of fuel gas which would otherwise be necessary to give an adequate flame temperature in Claus furnace 10. (The theoretical flame temperature of Claus furnace 10 without preheating is 1855° F.) Preheating the incinerator air in heater H5 and the incinerator tail gas in heater H4 can save about another 293 MCFD of fuel gas for a total saving of about 431 MCFD. At a fuel cost, for example, of $3.50 per MDF, the savings can amount to about $1500 per day.

Case 3—20 mol % H2S Acid Feed Gas

Case 3 illustrates a process according to the embodiment of FIG. 1 utilizing heaters H1, H2, H3, H4, H5, and H6 wherein heater H4 is utilized for incinerator tail gas heating but not necessarily for incinerator air preheating. A calculated heat balance is illustrated in Table 3A below.

TABLE 3A

| Equipment | Process Gas (°F.) In | Process Gas (°F.) Out | Heat Transferred (MBTU/Hr) To T2 | Heat Transferred (MBTU/Hr) From T2 |
|---|---|---|---|---|
| Waste Heat Boiler (11) | 2101 | 750 | 28,836 | |
| Heater (H1) | 260 | 572 | | 5,620 |
| Heater (H2) | 260 | 406 | | 2,501 |
| Heater (H3) | Varies | 650 | | 6,400 (max.) |
| Heater (H5) | 183 | 600 | | 1,654 |
| Incinerator Tail Gas Heater (H4) | 275 | 650 | | 7,520 |
| Heater (H6) | 90 | 600 | | 4,972 |
| Total | | | 28,836 | 28,667 |

As indicated for the illustrated case, a maximum of 6,400 MBTU/hr is transferred from T2 in heater H3 for regeneration of a CBA reactor. Depending on the regeneration heater H3 load, from about 169 to about 6,569 MBTU/hr can be available, for example, for steam generation, for superheating saturated steam, for heating incinerator air, and the like.

The illustrated case uses air and acid gas heaters H5 and H6 plus supplemental fuel to achieve about a 2100° F. flame temperature in Claus furnace 10. The following Table 3B illustrates energy savings which can be utilized.

TABLE 3B

| | |
|---|---|
| Flame temperature in furnace (10) without air (H5) and acid gas heating (H6) | 1239° F. |
| Use of air heater (H5) and acid gas heater (H6) saves | 178 MCFD |
| Use of tail gas heater (H4) saves | 180 MCFD |
| Total | 358 MCFD |

At, for example, a fuel cost of $3.50 per MCFD, savings can amount to about $1250 per day.

As illustrated by the calculated heat balances in each of Case 1, Case 2, and Case 3, there is sufficient heat available to perform reactor preheating, regeneration heating, and also to perform some heating of the inlet air to furnace 10, the acid gas to furnace 10, and tail gas to the incinerator, plus performing some preheating of the incinerator air stream in the illustrative cases. In Case 3, some fuel gas is necessary to obtain the required flame temperature in furnace 10; however, by utilizing indirect reheating according to the invention, a savings of about 358 MCFD of fuel gas can be realized.

The calculated cases also illustrate that excess heat over and above that required for the above uses can be available. Such energy can be utilized to generate saturated steam, to superheat saturated steam, for example, to about 650° F., or for any other process where such heat can be utilized.

EXAMPLE II

Valve Leakage

According to data collected for performance testing at a commercial facility employing two cold bed adsorption reactors operated similarly to the embodiment of FIG. 2 and FIG. 3, except that the CBA reactor undergoing regeneration was operated at a higher pressure than the CBA reactor undergoing adsorption, losses of sulfur containing species due to valve leakage accounted for an estimated 39% to 62% by weight of the total losses. The measured recovery for the tests was 97.77% by weight. Elimination of valve leakage losses by maintaining equal pressures at the outlets, for example, of the CBA reactors, according to the instant invention therefore has the calculated potential of increasing recovery to between 98.63% and 99.14%, thereby potentially increasing the overall CBA sulfur recovery efficiency by 1% or more.

As described, the invention in its various aspects can provide improved operating efficiency and in some aspects a fractional increase in the recovery of sulfur or diminished losses of sulfur-containing species. Many other advantages and uses of the aspects of the invention herein described will be apparent to those skilled in the art from the principles and characteristics herein disclosed. Accordingly, although the invention has been described as required in terms of preferred and alternative embodiments and illustrated in specific form, the invention is not to be limited thereby but by the claims attached hereto.

What is claimed is:

1. Process comprising:
   (a) combusting a gas stream containing hydrogen sulfide in the presence of oxygen in a thermal reaction zone to produce hot combustion gases containing hydrogen sulfide, sulfur dioxide, and free sulfur;
   (b) reacting at least a portion of the sulfur dioxide and hydrogen sulfide in the hot combustion gases in a catalytic reaction zone to produce additional free sulfur, the catalytic reaction zone comprising at least one catalytic reactor operated at a temperature effective to adsorb a preponderance of the thus produced free sulfur on catalyst therein and to produce a lean effluent stream;
   (c) heating a cool gas stream to a temperature effective for removal of adsorbed free sulfur from the catalyst of the at least one catalytic reactor in indirect heat exchange relation via a heat transfer medium with the hot combustion gases to produce a hot regeneration stream;
   (d) removing adsorbed free sulfur from the catalyst of the at least one catalytic reactor by passing the hot regeneration stream in contact therewith to produce a regeneration stream laden with free sulfur; and
   (e) cooling the hot regeneration stream laden with free sulfur and condensing free sulfur therefrom.

2. Process as in claim 1 comprising:
cooling the hot regeneration stream laden with free sulfur and condensing free sulfur therefrom to produce at least a portion of the cool gas stream of step (c) of claim 1.

3. Process as in claim 2 wherein:
the catalytic reaction zone comprises at least one catalytic reactor operated at a temperature above the dew point of sulfur and at least one catalytic reactor operated at a temperature effective for adsorbing a preponderance of the produced free sulfur on catalyst therein, and comprising:
(a) cooling the hot combustion gases produced in step (a) of claim 1 and condensing free sulfur therefrom to produce a cool lean stream containing sulfur dioxide and hydrogen sulfide;
(b) heating the cool lean stream to a temperature above the dew point of sulfur to produce a heated lean stream;
(c) reacting sulfur dioxide and hydrogen sulfide in the heated lean stream in said at least one catalytic reactor operated above the dew point of sulfur to produce a hot effluent stream containing sulfur dioxide, hydrogen sulfide, and free sulfur; and
(d) cooling the hot effluent stream and condensing free sulfur therefrom to produce a cool effluent stream lean in free sulfur.

4. Process as in claim 3 comprising:
heating the cool lean stream of step (b) of claim 3 in indirect heat exchange relation via a heat transfer medium with the hot combustion gases.

5. Process as in claim 3 wherein:
cooling the hot regeneration stream laden with free sulfur and condensing free sulfur therefrom provides a portion of the cool gas stream of step (c) of claim 1; and
the cool effluent stream lean in free sulfur produced in step (d) of claim 3 provides at least a portion of the cool gas stream lean in sulfur of step (c) of claim 1.

6. Process as in claim 1 wherein:
step (b) of claim 1 comprises reacting sulfur dioxide and hydrogen sulfide in a catalytic reaction zone comprising at least a first catalytic reactor and a second catalytic reactor, each of the first catalytic reactor and the second catalytic reactor having a catalyst bed therein by the steps of:
(a) passing a gas stream containing sulfur dioxide and hydrogen sulfide in contact with the catalyst bed of the first catalytic reactor to produce free sulfur at a temperature effective for adsorbing a preponderance of the thus-produced free sulfur on the catalyst bed thereof and to produce a lean effluent stream;
(b) removing adsorbed free sulfur from the catalyst bed of the second catalytic reactor by passing the hot regeneration stream in contact with the catalyst bed of the second catalytic reactor to produce a hot regeneration stream laden with sulfur;
(c) cooling the catalyst bed of the second catalytic reactor to a temperature effective for adsorbing free sulfur thereon by passing a cooling stream in contact with the catalyst bed of the second catalytic reactor; and
(d) passing the gas stream containing sulfur dioxide and hydrogen sulfide in contact with the catalyst bed of the second catalytic reactor to produce free sulfur at a temperature effective for adsorbing a preponderance of the thus produced free sulfur on the catalyst bed therein while regenerating and then cooling the catalyst bed of the first catalytic reactor 7. Process as in claim 6 wherein:
each of the first catalytic reactor and the second catalytic reactor have a horizontally supported catalyst bed therein; and
the direction of flow through the horizontally supported catalyst bed during adsorption, regeneration, and cooling is the same.

8. Process as in claim 6 wherein:
the direction of flow is all down flow.

9. Process as in claim 8 wherein:
the pressure at the outlet of each of the first catalytic reactor and the second catalytic reactor is about equal during adsorption, regeneration, and cooling.

10. Process as in claim 1 wherein:
the cool gas stream of step (c) of claim 1 is heated in indirect heat exchange with a high boiling heat transfer medium having a boiling point of at least above about 600° F., the high boiling heat transfer medium being in indirect heat exchange relation with the hot combustion gases.

11. Process as in claim 1 wherein:
the lean effluent stream produced in step (b) of claim 1 provides at least a portion of the cool gas stream heated in step (c) of claim 1.

12. Process for recovery of sulfur from a gas stream containing hydrogen sulfide comprising:
(a) combusting the gas stream in the presence of oxygen in a thermal reaction zone to produce hot combustion gases containing hydrogen sulfide, sulfur dioxide, and free sulfur;
(b) cooling the hot combustion gases and condensing free sulfur therefrom to produce a first cool lean stream containing hydrogen sulfide and sulfur dioxide;
(c) heating the first cool lean stream to a temperature above the dew point of sulfur in indirect heat exchange relation via a heat transfer medium with the hot combustion gases to produce a first heated lean stream; and
(d) reacting hydrogen sulfide and sulfur dioxide in the first heated lean stream in a catalytic reaction zone to produce additional free sulfur, the catalytic reaction zone comprising at least one catalytic reactor operated above the dew point of sulfur.

13. Process as in claim 12 wherein:
the first cool lean stream is heated in step (c) of claim 12 in indirect heat exchange relation with a high boiling heat transfer medium having a boiling point at least above about 600° F., the high boiling heat transfer medium being in indirect heat exchange relation with the hot combustion gases.

14. Process as in claim 13 wherein the catalytic reaction zone comprises at least a first catalytic reactor and a second catalytic reactor each operated at a temperature above the dew point of sulfur and wherein step (d) comprises:
(a) reacting hydrogen sulfide and sulfur dioxide in the first heated lean stream in the first catalytic reactor to produce a first catalytic reactor effluent stream containing free sulfur, hydrogen sulfide, and sulfur dioxide;
(b) cooling the first catalytic reactor effluent stream and condensing free sulfur therefrom to produce a second cool lean stream containing hydrogen sulfide and sulfur dioxide;
(c) heating the second cool lean stream to a temperature above the sulfur dew point in indirect heat exchange relation via the high boiling medium with the hot combustion gases to produce a second heated lean stream containing hydrogen sulfide and sulfur dioxide;
(d) reacting hydrogen sulfide and sulfur dioxide in the second heated lean stream in the second catalytic reactor to produce a second catalytic reactor effluent stream containing free sulfur, hydrogen sulfide, and sulfur dioxide; and
(e) cooling the second catalytic reactor effluent stream and condensing free sulfur therefrom to produce a third cool lean stream containing hydrogen sulfide and sulfur dioxide.

15. Process as in claim 14 wherein:
the second cool lean stream is heated to a temperature above the sulfur dew point in step (c) of claim 13 in indirect heat exchange relation with the high boiling heat transfer medium having a boiling point at least above about 600° F., the high boiling heat transfer medium being in indirect heat exchange relation with the hot combustion gases.

16. Process as in claim 15 further comprising:
recovering additional free sulfur from the third cool lean stream by a tail gas treating process to produce a residue gas stream.

17. Process as in claim 16 wherein:
the tail gas treating process is the cold bed adsorption process.

18. Process as in claim 16 wherein:
the residue gas stream resulting from treatment by the tail gas treating process is heated in indirect heat exchange via a heat exchange medium with the hot combustion gases prior to incineration.

19. Apparatus comprising:
combustion means for combusting in the presence of oxygen a gas stream containing hydrogen sulfide to produce hot combustion gases containing hydrogen sulfide, sulfur dioxide, and free sulfur;
first catalytic reactor means in flow communication with the combustion means for receiving and reacting at least a portion of said hydrogen sulfide and sulfur dioxide in the hot combustion gases for producing free sulfur, for adsorbing a preponderance of the thus produced free sulfur on catalyst therein and for producing a lean effluent stream;
heat exchange means in indirect heat exchange relation via a heat transfer medium with the hot combustion gases for heating a cool gas stream in indirect heat exchange relation with the hot combustion gases to produce a hot regeneration stream having a temperature effective for removing sulfur adsorbed on the catalyst of said first catalytic reactor means; and
regeneration and recovery means in flow communication with the heat exchange means for receiving and passing the hot regeneration stream in contact with the catalyst having free sulfur adsorbed thereon to remove free sulfur therefrom and for recovering the thus-removed free sulfur.

20. Apparatus as in claim 19 wherein:
the regeneration and recovery means is connected in flow communication with the heat exchange means and further operable for providing to the heat exchange means at least a portion of the cool gas stream heated in indirect heat exchange relation with the hot combustion gases to produce the hot regeneration stream.

21. Apparatus as in claim 20 further comprising:
a second catalytic reactor means for reacting at least a portion of said hydrogen sulfide and sulfur dioxide in the hot combustion gases for producing free sulfur, for adsorbing a preponderance of the thus produced free sulfur on catalyst therein and for producing a lean effluent steam;
first means for providing a feed stream containing hydrogen sulfide and sulfur dioxide derived from the hot combustion gases to one of the first catalytic reactor means and the second catalytic reactor means, and wherein
said regeneration and recovery means further comprises second means for passing the hot regeneration stream in contact with the catalyst of one other of the first catalytic reactor means and the second catalytic reactor means having free sulfur adsorbed thereon for removing free sulfur therefrom and for recovering the thus removed free sulfur.

22. Apparatus as in claim 21 further comprising:
make-up gas means for providing a portion of the lean effluent stream of said one of the first catalytic reactor means and the second catalytic reactor means as at least a portion of the cool gas stream heated in indirect heat exchange relation with the hot combustion gases to produce the hot regeneration stream.

23. Apparatus as in claim 22 wherein:
said make-up gas means is further functional for maintaining the first catalytic reactor means and the second catalytic reactor means at about equal pressures.

24. Apparatus for the recovery of sulfur comprising:
combustion means for combusting a gas stream containing hydrogen sulfide to produce hot combustion gases containing hydrogen sulfide, sulfur dioxide, and free sulfur;
first cooling means in flow communication with the combustion means for receiving and cooling the hot combustion gases and condensing free sulfur therefrom to produce a first cool stream;
first heat exchange means in flow communication with the first cooling means for receiving and providing the first cool stream in indirect heat exchange relation via a heat transfer medium with the hot combustion gases for heating the first cool stream to a temperature above the dew point of sulfur; and first catalytic reactor means in flow communication with the first heat exchange means for receiving the thus heated stream therefrom and effective for reacting sulfur dioxide and hydrogen sulfide in the stream at a temperature above the dew point of sulfur to produce an effluent stream containing free sulfur.

25. Apparatus as in claim 24 further comprising:
second cooling means in flow communication with the first catalytic reactor means for receiving the effluent stream containing free sulfur therefrom and for cooling the stream and condensing free sulfur therefrom to produce a second cool stream;
second heat exchange means in flow communication with the second cooling means for receiving and providing the second cool stream in indirect heat exchange relation via the heat transfer medium with the hot combustion gases for heating the second cool stream to a temperature above the dew point of sulfur;

second catalytic reactor means in flow communication with the second heat exchange means for receiving the thus heated second cool stream therefrom and effective for reacting the sulfur dioxide and hydrogen sulfide in said stream at a temperature above the dew point of sulfur to produce an effluent stream containing free sulfur; and third cooling means connected in flow communication with the second catalytic reactor means for receiving the effluent stream therefrom and for cooling and condensing sulfur from said stream.

26. Apparatus comprising:

first catalytic reactor means and second catalytic reactor means for reacting hydrogen sulfide and sulfur dioxide in a feed stream and depositing a preponderance of the free sulfur thus produced on a catalyst bed in one of the first catalytic reactor means and the second catalytic reactor means;

heat exchange means for heating a cool stream in indirect heat exchange relation via a heat transfer medium with hot combustion gases produced by combustion of hydrogen sulfide in the presence of oxygen to produce said hydrogen sulfide and sulfur dioxide in said feed stream to produce a regeneration steam;

means for providing the feed stream in flow communication with one of the first catalytic reactor and the second catalytic reactor and for providing one of the cool stream and the regeneration stream in flow communication with the other of the first catalytic reactor means and the second catalytic reactor means;

means in flow communication with the other of the first catalytic reactor means and the second catalytic reactor means for recovering free sulfur from an effluent stream from said other of the first catalytic reactor means and the second catalytic reactor means; and means in flow communication between the outlets of the first catalytic reactor and the second catalytic reactor for maintaining the outlets of first catalytic reactor means and the second catalytic reactor means at about equal pressures.

27. Apparatus as in claim 26 wherein:

said means for maintaining comprises means for providing at least a portion of an effluent stream from said one of the first catalytic reactor means and the second catalytic reactor means for use as a portion of said one of the cool stream and the regeneration stream to said other of the first catalytic reactor means and the second catalytic reactor means.

* * * * *